US006176472B1

(12) United States Patent
Burger

(10) Patent No.: US 6,176,472 B1
(45) Date of Patent: Jan. 23, 2001

(54) ELEMENT FOR CONNECTING AND COVERING A JOINT AND HANDRAIL OR THE LIKE COMPRISING AT LEAST ONE SUCH ELEMENT

(75) Inventor: Bertrand Burger, Niedermorschwihr (FR)

(73) Assignee: Buregr et Cie (Societe Anonyme), Sainte-Marie-aux-Mines (FR)

( * ) Notice: Under 35 U.S.C. 154(b), the term of this patent shall be extended for 0 days.

(21) Appl. No.: 09/229,957

(22) Filed: Jan. 14, 1999

(30) Foreign Application Priority Data

Jan. 14, 1998 (FR) .................................................. 98 00470

(51) Int. Cl.[7] .................................................. E04H 17/14
(52) U.S. Cl. ................................ 256/59; 256/68; 256/69; 403/312; 403/311; 403/310; 403/286
(58) Field of Search ..................................... 403/312, 311, 403/310, 309, 308, 344, 286; 256/59, 68, 69

(56) References Cited

U.S. PATENT DOCUMENTS

| 379,688 | * | 3/1888 | Dennis | 403/283 X |
|---|---|---|---|---|
| 1,377,101 | * | 5/1921 | Sparling | 403/313 |
| 2,798,749 | * | 7/1957 | Herman et al. | 403/283 |
| 2,886,278 | * | 5/1959 | Opie | 256/65 X |
| 3,023,992 | * | 3/1962 | Tisdall | 248/251 |
| 3,707,304 | | 12/1972 | Gostling . | |
| 4,516,874 | | 5/1985 | Yang et al. . | |
| 4,703,769 | * | 11/1987 | Harrison | 403/233 X |
| 5,800,544 | * | 9/1998 | Demopulos et al. | 623/13 |

FOREIGN PATENT DOCUMENTS

974055 * 10/1963 (GB) ...................................... 256/59

* cited by examiner

Primary Examiner—Lynne H. Browne
Assistant Examiner—Ernesto Garcia
(74) Attorney, Agent, or Firm—Young & Thompson

(57) ABSTRACT

A connecting and covering member for a joint, as well as a handrail or the like embodying the same, wherein the connecting and covering element extends between and interconnects two contiguous aligned portions of the elongated structure. The connecting and covering element comprises a hollow body in the form of a sleeve that surrounds and interconnects adjacent ends of the elongated members. The sleeve is slotted longitudinally and has cutouts for shape matingly receiving a plate which is secured to both of the adjacent portions. On opposite sides of the slot and on opposite sides of the cutout, the connecting and covering member has holes through which fasteners pass, to secure the assembly together.

5 Claims, 6 Drawing Sheets

Fig-1
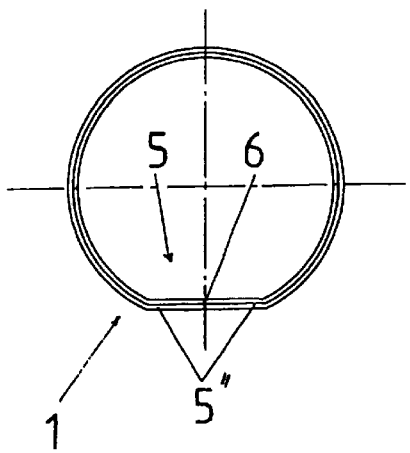
Fig-1A
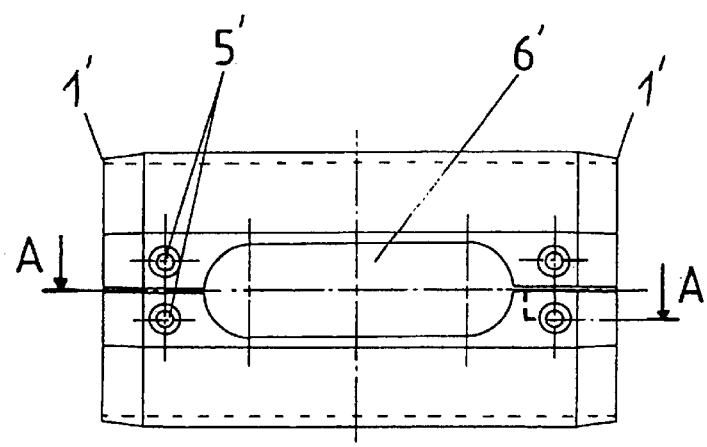
Fig-1B
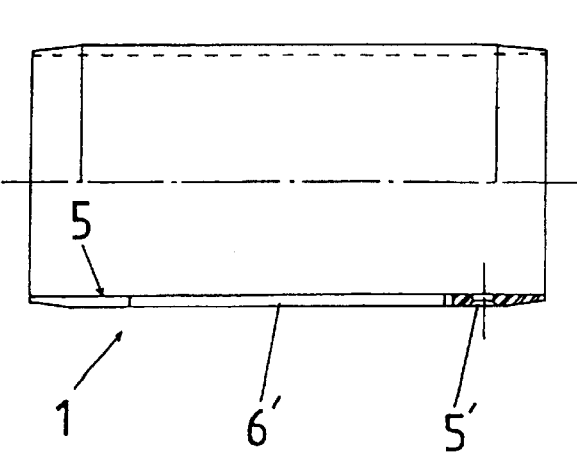
Fig-1C

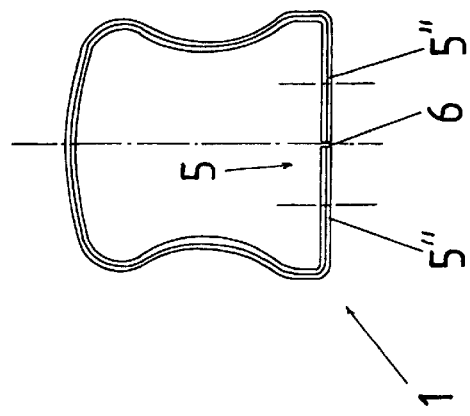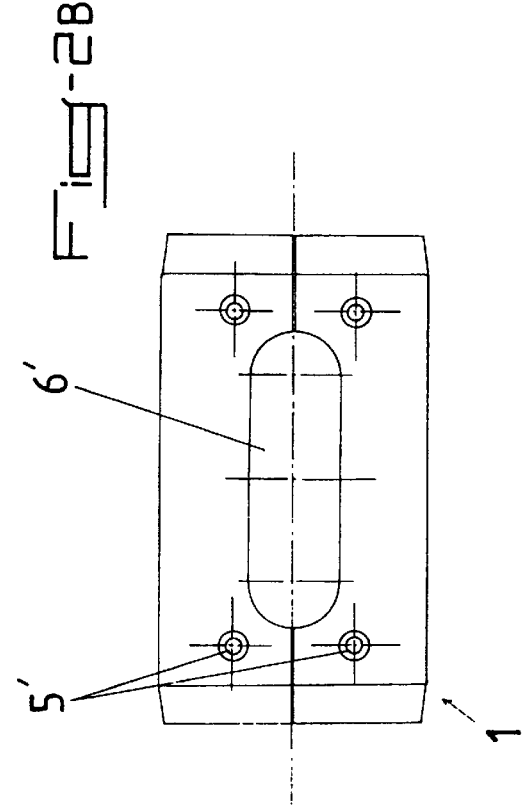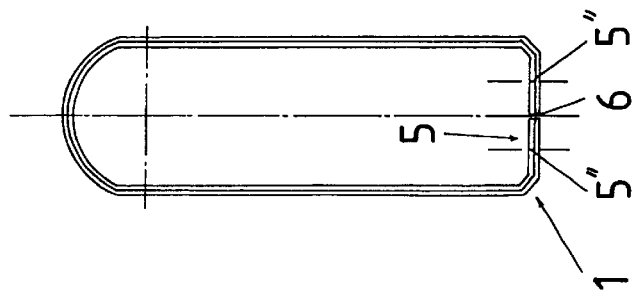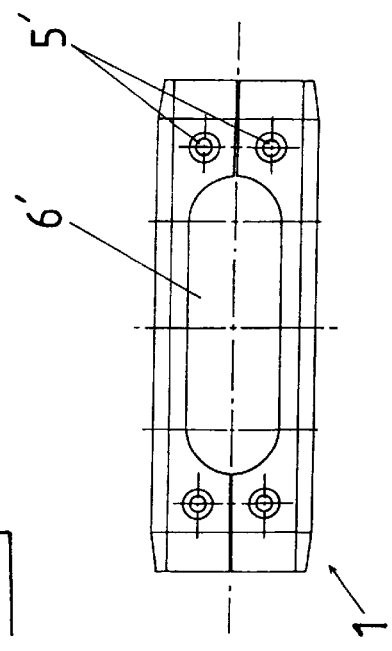

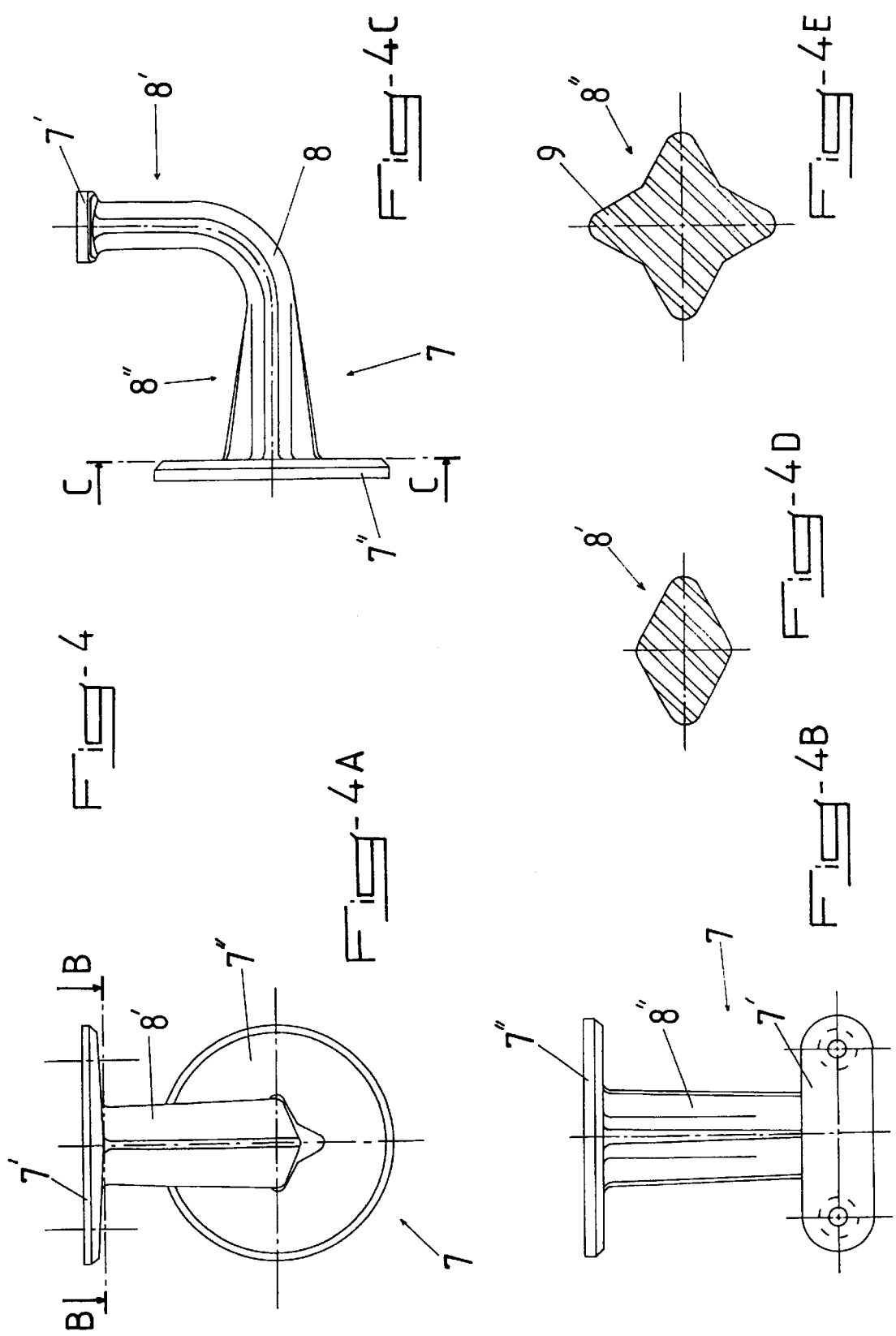

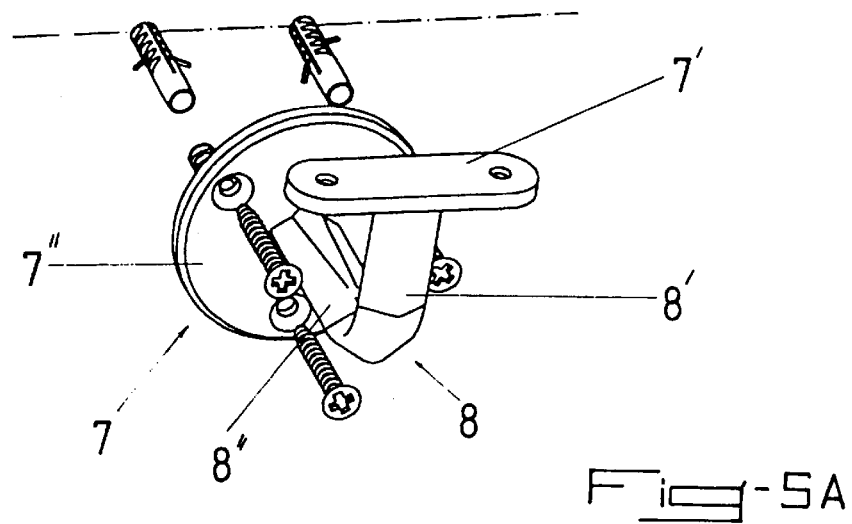
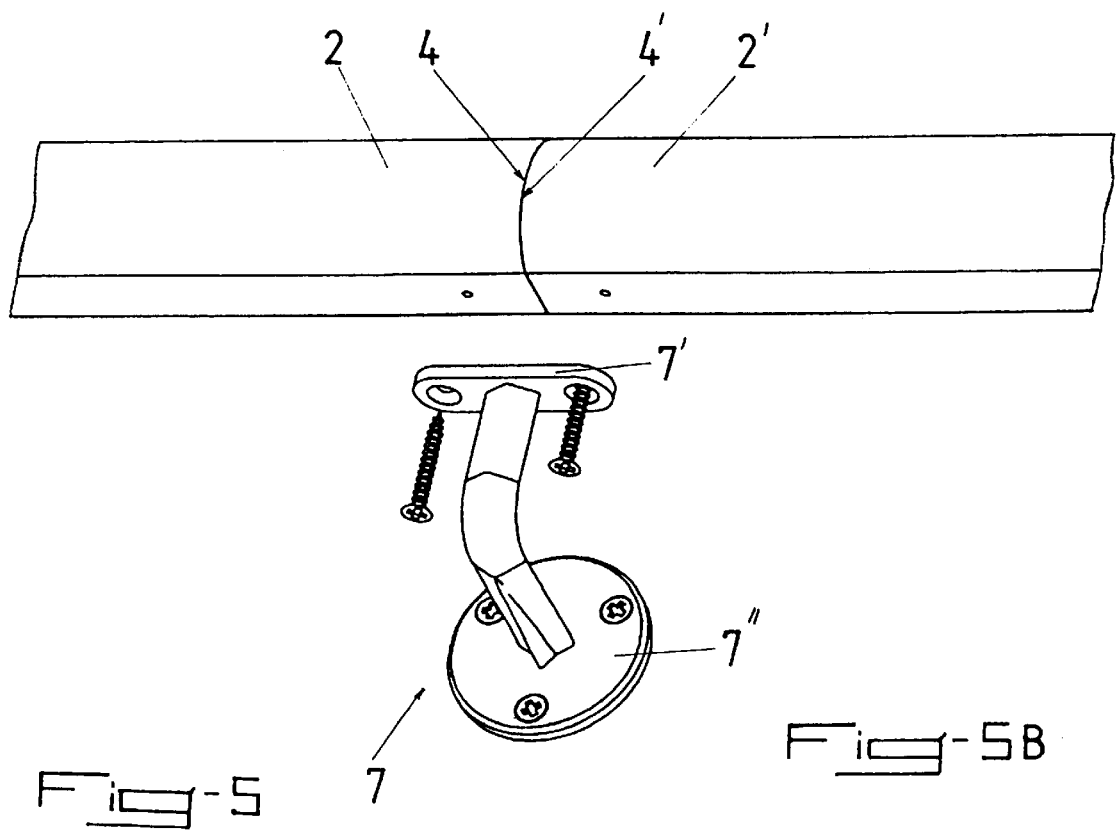

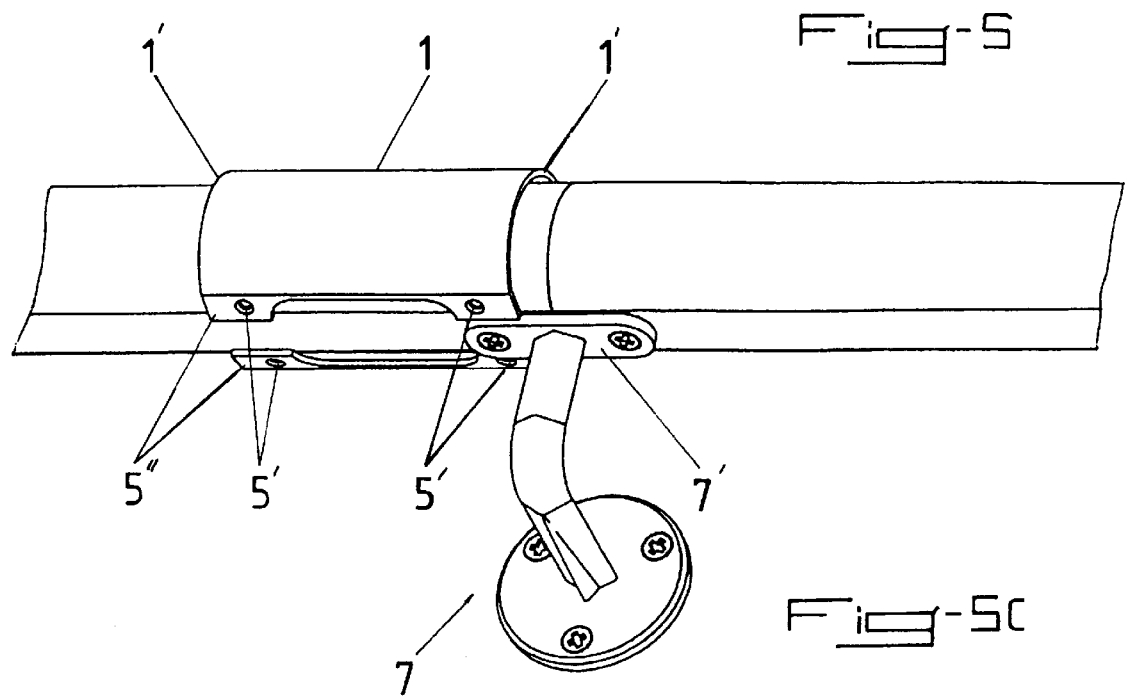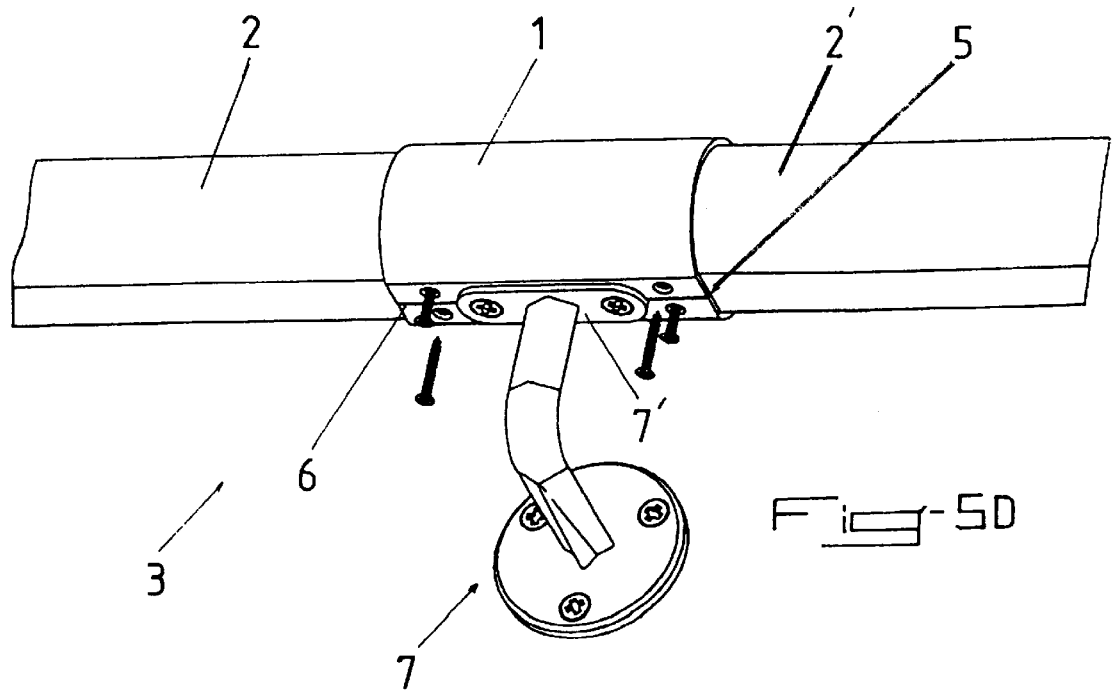

ELEMENT FOR CONNECTING AND COVERING A JOINT AND HANDRAIL OR THE LIKE COMPRISING AT LEAST ONE SUCH ELEMENT

CROSS REFERENCE TO RELATED APPLICATION

This application corresponds to French application 98 00470 of Jan. 14, 1998, the disclosure of which is incorporated herein by reference.

FIELD OF THE INVENTION

The present invention relates to the field of building and building equipment, particularly safety and protection devices in the form of elongated structures for example along a wall of a staircase or a corridor, and has for its object a connecting and covering element for a joint, as well as a handrail, ramp, protective bar or the like comprising at least one such element.

BACKGROUND OF THE INVENTION

Handrails, protective wall bars or the like consist generally of one or several elongated members rigidly connected to a wall or such support with regard to each other so as to constitute an elongated structure which can be continuous or not.

To make a continuous structure of great length, it is generally necessary, for reasons of stability and cost, to assemble in a contiguous manner several portions or elongated segments, which gives rise to forming mechanically weak and aesthetically lacking joint regions, as well as the multiplication of anchoring points to the wall or similar support.

A supplemental difficulty arises when the portions or segments comprising the body of the handrail or protective bar are made of a material adapted to deform with time and/or subject to deformations induced by external factors (water, heat, cold, . . . ), such as for example wood or similar "living" material.

The problems set forth above have not until now found a satisfactory solution both as to the aesthetic point of view and as to the mechanical point of view and as to the cost point of view.

SUMMARY OF THE INVENTION

The present invention has particularly for its object to overcome the mentioned drawbacks.

To this end, it has for its object a connecting and covering element for a joint between two contiguous aligned portions of an elongated structure, such as a handrail, a ramp, a protective bar or the like, particularly of wood, characterized in that it is principally constituted by a hollow body in the form of a sleeve which can surround adjustably the adjacent or neighboring ends of the two portions in question, the sleeve being longitudinally slotted, comprising a flat longitudinal wall portion provided with a cutout for the reception by nesting, at least partially, of a securement plate, and comprising openings for the passage of securement means permitting securing said element to each end of the contiguous portion.

The invention also relates to a handrail, ramp, protective bar or elongated structure of analogous shape, constituted by several contiguous aligned portions, characterized in that the adjacent ends of two contiguous portions are surrounded and interconnected by connection and covering elements such as described above and in that said contiguous portions are fixed rigidly to the wall or like support in question, by means of securement plates distributed along said handrail, ramp, protective bar or the like.

BRIEF DESCRIPTION OF THE DRAWINGS

The invention will be better understood from the following description, which relates to different preferred embodiments, given by way of non-limiting example, and explained with reference to the accompanying schematic drawings, in which:

FIGS. 1A, 1B and 1C are respectively transverse cross-sectional views, from above and in section along the line A—A, of a connecting and covering element for a joint according to a first embodiment of the invention;

FIGS. 2A and 2B are respectively views in transverse cross-section and from below, of a connecting and covering element for a joint according to a second embodiment of the invention;

FIGS. 3A and 3B are respectively transverse cross-sectional end views from below of a connecting and covering element for a joint according to a third embodiment of the invention;

FIGS. 4A, 4B, 4C, 4D and 4E are respectively front elevational, top plan, side elevational, cross-section along line B—B and cross-section along C—C views of a securement plate according to the invention;

FIGS. 5A, 5B, 5C and 5D are perspective views showing the different phases of mounting a securement plate according to the invention and a connecting element, as shown in FIG. 1, to form a handrail, and, FIGS. 6A and 6B are perspective views showing the phases of mounting a connecting element such as is shown in FIG. 3.

DETAILED DESCRIPTION OF THE INVENTION

Figures 6, 6A:
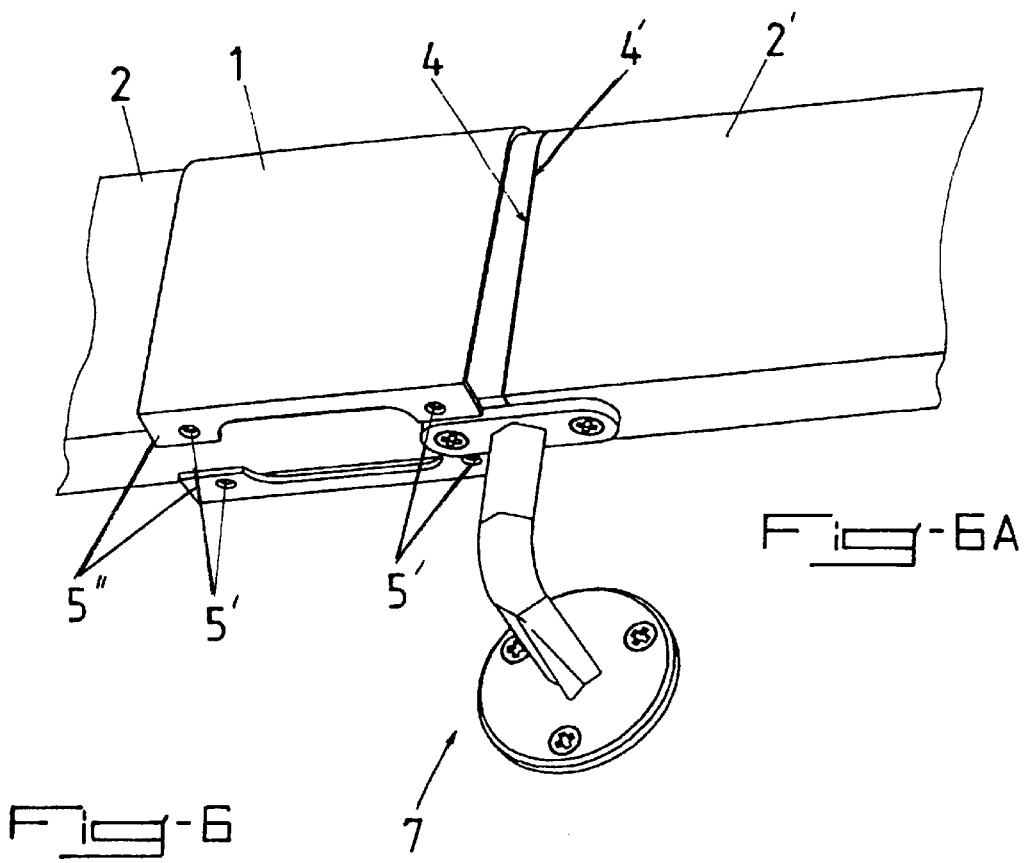
Figure 6B:
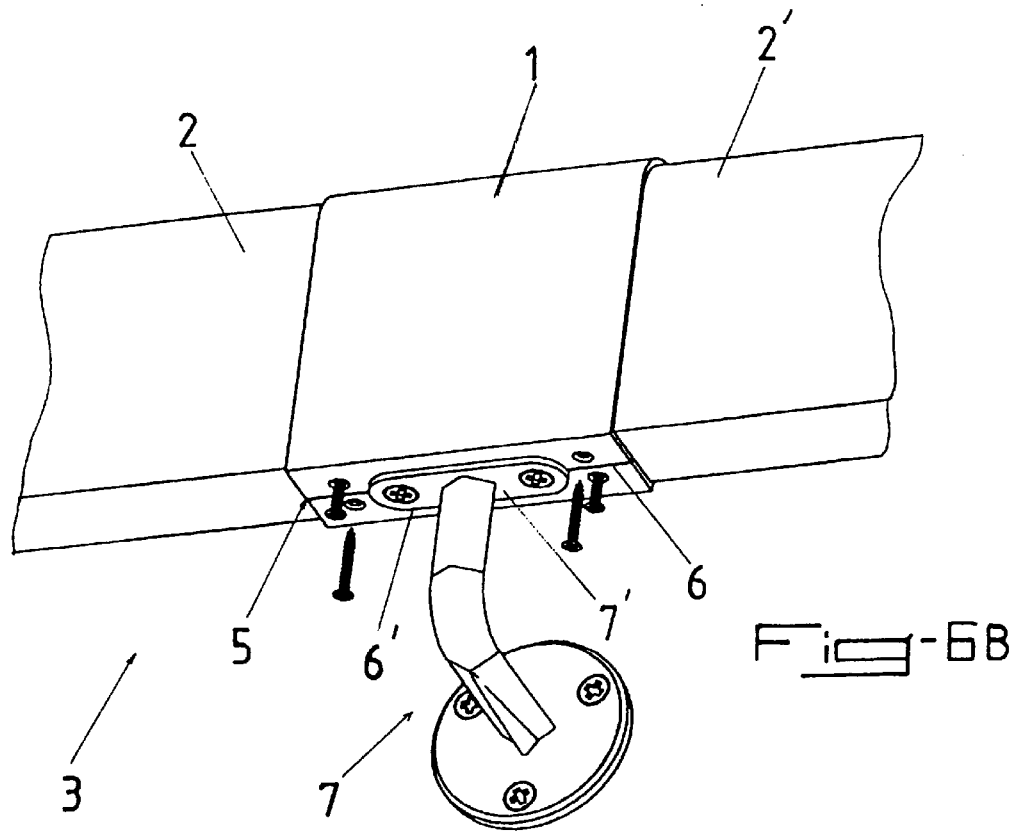

As is shown in FIGS. 1, 2, 3, 5 and 6, the connecting and covering element for a joint is principally constituted by a hollow body in the form of a sleeve 1 which can surround in an adjustable manner the adjacent or neighboring ends 4, 4' of two portions 2, 2' in question, the sleeves 1 being slotted longitudinally, comprising a flat longitudinal wall portion 5 provided with a cutout 6' for receiving and nesting at least partially a plate 7' of a securement member 7, and comprising openings 5' for securement means permitting securing said element 1 to each end 4, 4' of contiguous portions 2, 2'.

The element 1 accordingly permits entirely covering the transition region between two contiguous portions 2 and 2' (and hence, if the two portions 2 and 2' have similar appearances, giving the illusion of a continuous structure) and rigidly to connect the two portions 2 and 2' to each other by jacketing their ends 4, 4', whilst enabling them at least to a certain degree to adapt to possible deformations of said interconnected portions 2 and 2', as well as their possible relative movements (because of the structural discontinuity introduced by the slot 6).

So as to reinforce the above properties, and particularly also to give to the handrail 1 or the like an external surface without discontinuity and/or substantial roughness to the touch, and to ensure blockage in rotation and securement of the sleeve 1 on the portions 2, 2'; since sleeve 1 has a wall of small thickness, or a rigid, elastic and resilient material, such as for example polyamide or a like synthetic material, whose two opposite side edges 1' are chamfered, since sleeve 1 comprising a flat wall portion 5 divided into two half portions 5" by the longitudinal slot 6 and each of said half portions 5" being secured to each end 4, 4' of each of the contiguous portions 2, 2'.

The properties of the material used and the structure of the split sleeve also permit mounting by resilient gripping of the element 1 on the handrail 3 or the like (by separating the edges of the slot), thereby avoiding a difficult assembly.

According to one characteristic of the invention, shown in FIGS. 1B, 2B and 3B of the accompanying drawings, the element 1 can be provided, at the level of the flat wall portion 5, with a cutout 6' for the reception by nesting of at least part of a plate 7' of a securement member 7, said cutout 6' being traversed by the slot 6 separating the two half portions of the flat wall 5".

Thus, the securement member 7 is, on the one hand, secured by means of screws or like securement elements to the two contiguous ends 4, 4' of adjacent portions 2, 2' and, on the other hand, maintained and blocked by the assembly of shapes in the sleeve 1, from which results an extremely rigid and resistant mounting.

The assembly of the connecting and covering element of joint 1 and securement member 7 permits accordingly providing a securement which is both aesthetically pleasing and strong (because particularly of the securement of each of the elements on the adjacent portions forming the elongated structure), and providing an elongated structure formed by juxtaposition of discontinuous portions having a rigidity similar to that of an elongated structure made of a single piece.

The present invention also has for its object a handrail, a bar or protective ramp or the like constituted by several contiguous aligned portions, characterized in that the adjacent ends 4, 4' of two contiguous portions 2, 2' are surrounded and interconnected by connecting and covering elements 1 such as described above and in that said contiguous portions 2, 2' are secured rigidly to the wall or like support in question by means of securement member 7 distributed along said handrail, ramp, protective bar or the like 3.

As shown in FIGS. 4, 5 and 6 of the accompanying drawings, the securement members 7 each consist of an elbowed bracket 8 provided at one of its ends with a plate 7" for securement to the wall or like support and at its other end with a plate 7' for securement to two contiguous portions 2, 2', received shape-matingly in a cutout 6' provided in a portion of the flat surface 5 of the connecting and covering element 1 which covers the adjacent ends 4, 4' of two contiguous portions 2, 2' in question.

According to one characteristic of the invention, shown in FIGS. 4B, 4C and 4D of the accompanying drawings, the plates 7' of the contiguous portions 2, 2' have an oblong shape oriented with its greatest length in a longitudinal direction of the handrail or the like 3 and the elbowed bracket 8 has a transverse cross-section of lozenge shape whose large diagonal is oriented in the longitudinal direction of the handrail or the like 3 and is comprised by two rectilinear segments 8', 8" forming between them a substantially right angle.

So as to increase the resistance to ending of the securement plates 7, it can be provided that the elbowed bracket 8 comprises, at the level of its segment 8" secured to the plate 7" for connecting to the wall or analogous support, reinforcement ribs 9 at the level of opposite edges interconnected, in cross-section, by the small diagonal.

Those skilled in the art will understand that the portions 2, 2' and the sleeve 1 can be formed of different materials and have different shapes.

However, according to one preferred embodiment, the contiguous aligned portions 2, 2' consist of wood, treated or not, and have, in cross-section, a rounded, circular, omega, rectangular, square or other shape, being provided with a longitudinal flat whose width is identical to that of the flat surface portion 5 of the connecting and covering element 1.

As shown in FIGS. 5 and 6 of the accompanying drawings, the connection between two contiguous portions 2 and 2' in question, could be ensured not only by the connecting element 1 but also by the plate 7' and the securement member 7, which will then preferably straddle the junction region between the end portions 4 and 4' in question.

Of course, the invention is not limited to the embodiments described and shown in the accompanying drawings. Modifications remain possible, particularly as to the construction of the various elements or by substitution of technical equivalents, without thereby departing from the scope of protection of the invention.

What is claimed is:

1. An elongated structure comprising:
   a plurality of contiguous aligned portions having ends;
   a connecting and covering element surrounding and interconnecting two adjacent ends; and
   a securement member connected to said two adjacent ends for securement to a support;
   said element comprising a hollow body in the form of a sleeve having a first end and an opposite second end; said sleeve having a flat longitudinal portion provided with a cutout and a longitudinal slot extending lengthwise from the first end to the second end;
   said securement member comprising an elbowed portion having at one end a first plate secured to both said adjacent ends and being received in said cutout, and at a second end a second plate for securement to said support; and
   said sleeve having openings for receiving securement means for securing said element to each of said adjacent ends.

2. The elongated structure according to claim 1, wherein said first plate has an oblong shape oriented with its greater length in a longitudinal direction of said elongated structure, and said elbowed portion has a transverse cross-section of lozenge shape having its greatest dimension oriented in said longitudinal direction.

3. The elongated structure according to claim 2, wherein said elbowed portion has ribs thereon extending lengthwise thereof.

4. The elongated structure according to claim 1, wherein said aligned portions are of wood and have a flat surface thereon whose width is the same as the flat portion of said connecting and covering element.

5. The elongated structure according to claim 1, wherein the sleeve has a wall of small thickness of rigid, elastic and resilient material, whose two opposite end edges are chamfered, said flat wall portion being separated into two half portions by said longitudinal slot, and each of said half portions being secured to each of said adjacent ends.

* * * * *